US009671499B2

(12) United States Patent
Liu et al.

(10) Patent No.: US 9,671,499 B2
(45) Date of Patent: Jun. 6, 2017

(54) HIGH-SENSITIVITY GPS DEVICE WITH DIRECTIONAL ANTENNA

(71) Applicant: Microsoft Technology Licensing LLC, Redmond, WA (US)

(72) Inventors: Jie Liu, Medina, WA (US); Gerald R. DeJean, Redmond, WA (US); Nissanka B. Priyantha, Redmond, WA (US); Yuzhe Jin, Bellevue, WA (US); Edward Hart, Redmond, WA (US); S M Shahriar Nirjon, Charlottesville, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 822 days.

(21) Appl. No.: 14/067,744

(22) Filed: Oct. 30, 2013

(65) Prior Publication Data

US 2015/0116151 A1    Apr. 30, 2015

(51) Int. Cl.
*G01S 19/30* (2010.01)
*G01S 19/28* (2010.01)
(Continued)

(52) U.S. Cl.
CPC .............. *G01S 19/30* (2013.01); *G01S 19/28* (2013.01); *G01S 19/42* (2013.01); *G01S 19/36* (2013.01)

(58) Field of Classification Search
CPC .......... G01S 19/01; G01S 19/13; G01S 19/24; G01S 19/28; G01S 19/30; G01S 19/35;
(Continued)

(56) References Cited

U.S. PATENT DOCUMENTS 4,797,677 A    1/1989  MacDoran et al.
5,119,102 A    6/1992  Barnard
(Continued)

FOREIGN PATENT DOCUMENTS

| CN | 1425226 | 6/2003 |
|---|---|---|
| CN | 103064092 A | 4/2013 |
| CN | 103091687 | 5/2013 |

OTHER PUBLICATIONS

Akopian et al, "A Fast Positioning Method Without Navigation Data Decoding for Assisted GPS Receivers," IEEE Transactions on Vehicular Technology, vol. 58, Issue 8, Oct. 2009, pp. 4640-4645.
(Continued)

*Primary Examiner* — Bernarr Gregory
(74) *Attorney, Agent, or Firm* — Lee & Hayes, PLLC

(57) ABSTRACT

The effective use of weak GPS signals that are present in various environments enables an electronic device to pinpoint its location in such environments. The electronic device uses an antenna to perform sequential scanning in multiple directions for global positioning system (GPS) signals. The electronic device further analyzes GPS signals obtained from scanning the multiple directions to determine a number of acquired GPS satellites that provided the GPS signals. The GPS signals include code phases of the acquired GPS satellites. The electronic device then computes a location of the electronic device based on the code phases of the acquired GPS satellites when the number of acquired GPS satellites meets a threshold.

20 Claims, 4 Drawing Sheets

(51) Int. Cl.
  *G01S 19/36* (2010.01)
  *G01S 19/42* (2010.01)
  *G01S 19/00* (2010.01)

(58) Field of Classification Search
  CPC .......... G01S 19/36; G01S 19/38; G01S 19/39;
         G01S 19/42; G01S 19/23; G01S 19/34
  See application file for complete search history.

(56) References Cited

U.S. PATENT DOCUMENTS

| | | | |
|---|---|---|---|
| 5,134,407 A | 7/1992 | Lorenz et al. | |
| 6,104,338 A | 8/2000 | Krasner | |
| 6,121,923 A * | 9/2000 | King | G01S 19/34 342/357.42 |
| 6,188,351 B1 | 2/2001 | Bloebaum | |
| 6,285,316 B1 | 9/2001 | Nir et al. | |
| 6,300,899 B1 * | 10/2001 | King | G01S 19/23 342/357.69 |
| 6,313,786 B1 | 11/2001 | Sheynblat et al. | |
| 6,417,801 B1 | 7/2002 | van Diggelen | |
| 6,448,925 B1 | 9/2002 | Shridhara | |
| 6,466,164 B1 | 10/2002 | Akopian et al. | |
| 6,546,040 B1 | 4/2003 | Eschenbach | |
| 6,583,756 B2 | 6/2003 | Sheynblat | |
| 6,642,884 B2 * | 11/2003 | Bryant | G01S 19/24 342/357.64 |
| 6,700,533 B1 | 3/2004 | Werb et al. | |
| 6,731,701 B2 * | 5/2004 | Vorobiev | G01S 19/24 342/357.59 |
| 6,788,249 B1 | 9/2004 | Farmer et al. | |
| 6,828,935 B1 | 12/2004 | Dunn et al. | |
| 6,865,478 B2 | 3/2005 | Sirola et al. | |
| 7,027,486 B2 | 4/2006 | Sullivan | |
| 7,266,142 B2 | 9/2007 | Sullivan | |
| 7,301,992 B2 | 11/2007 | Kohli et al. | |
| 7,505,508 B2 | 3/2009 | Sullivan | |
| 7,595,754 B2 | 9/2009 | Mehta | |
| 7,623,067 B2 * | 11/2009 | Raman | G01S 19/24 342/357.48 |
| 7,738,531 B2 | 6/2010 | Patrick | |
| 7,821,455 B2 | 10/2010 | Chen et al. | |
| 7,893,869 B2 | 2/2011 | Gaal et al. | |
| 8,024,013 B2 | 9/2011 | Haartsen | |
| 8,125,378 B1 | 2/2012 | Jarpenvaa | |
| 8,259,010 B2 | 9/2012 | Ische et al. | |
| 8,390,512 B2 | 3/2013 | Ische et al. | |
| 8,462,831 B2 | 6/2013 | Sturza et al. | |
| 2002/0005802 A1 | 1/2002 | Bryant et al. | |
| 2002/0138198 A1 | 9/2002 | Morita | |
| 2003/0152134 A1 | 8/2003 | Vorobiev et al. | |
| 2004/0017311 A1 | 1/2004 | Thomas et al. | |
| 2004/0230824 A1 | 11/2004 | Heil | |
| 2006/0152409 A1 | 7/2006 | Raman et al. | |
| 2006/0208943 A1 | 9/2006 | Gronemeyer | |
| 2007/0063894 A1 | 3/2007 | Yu | |
| 2008/0252517 A1 | 10/2008 | Fuchs et al. | |
| 2009/0318167 A1 | 12/2009 | Pon et al. | |
| 2010/0117897 A1 | 5/2010 | Riley et al. | |
| 2010/0283673 A1 | 11/2010 | Farrokhi et al. | |
| 2010/0318292 A1 | 12/2010 | Kulik et al. | |
| 2011/0080320 A1 | 4/2011 | Farrokhi et al. | |
| 2011/0103432 A1 | 5/2011 | Tangudu et al. | |
| 2011/0279324 A1 | 11/2011 | Bolotski et al. | |
| 2011/0298658 A1 | 12/2011 | Riley et al. | |
| 2012/0146850 A1 | 6/2012 | Liu et al. | |
| 2012/0249368 A1 | 10/2012 | Youssef et al. | |
| 2013/0027245 A1 | 1/2013 | Lennen | |
| 2014/0015713 A1 | 1/2014 | Liu et al. | |

OTHER PUBLICATIONS

Candes, "Compressive Sampling," Proceedings of the International Congress of Mathematicians, Madrid, Spain, Aug. 22-30, 2006, pp. 1-20.
Thor et al, "A Direct RF Sampling Multifrequency GPS Receiver," Position Location and Navigation Symposium, 2002 IEEE, Apr. 2002, pp. 44-51.
Kong, et al., "A Compressed Sensing Technique for GNSS Acquisition", ITM 2012, Proceedings of the 2012 International Technical Meeting of the Institute of Navigation, Feb. 1, 2012, pp. 356-361.
Muthuraman, et al., "Coarse Time Navigation: Equivalence of Algorithms and Reliability of Time Estimates", ITM 2012, Proceedings of the 2012 International Technical Meeting of the Institute of Navigation, Feb. 1, 2012, pp. 1115-1138.
Othieno, et al., "Combined Doppler and Time-Free Positioning Technique for Low Dynamics Receivers", Plans 2012, Proceedings of IEEE/ION Plans 2012, The Institute of Navigation, Apr. 26, 2002, pp. 60-65.
The PCT Search Report mailed Sep. 27, 2013 for PCT application No. PCT/US2013/050747.
The PCT Search Report mailed Feb. 17, 2015 for PCT application No. PCT/US2014/062438.
Office action for U.S. Appl. No. 13/550,454, mailed on Aug. 28, 2015, Liu et al., "Reduced Sampling Low Power GPS", 16 pages.
PCT Written Opinion mailed Sep. 9, 2015 for PCT Application No. PCT/US14/062348, 7 pages.
Translated Chinese Office Action mailed Dec. 8, 2015 for Chinese patent application No. 201380038013.1, a counterpart foreign application of U.S. Appl. No. 13/550,454, 15 pages.
The European Office Action mailed Feb. 1, 2016 for European Patent Application No. 13741955.2, a counterpart foreign application of U.S. Appl. No. 13/550,454, 7 pages.
International Search Report and Written Opinion Issued in PCT Patent Application No. PCT/US2014/052429, Mailed Date: Jan. 28, 2015, 17 Pages.
"International Preliminary Report on Patentability IssueD in PCT Application No. PCT/US2014/052429", Mailed Date: Sep. 28, 2015, 8 Pages.
Second Written Opinion Issued in PCT Patent Application No. PCT/US2014/052429, Mailed Date: Jun. 9, 2015, 6 Pages.
Ya-peng, et al, "Waveform Design for Compressive Sensing Radar Based on Minimizing the Statistical Coherence of the Sensing Matrix", Journal of Electronics and Information Technology, vol. 33, No. 9, China Academic Journal Electronic Publishing House, Sep. 2011, pp. 2097-2102.
International Preliminary Report on Patentability issued in PCT Application No. PCT/US2014/062348 dated Jan. 25, 2016, 6 pages.
Office action for U.S. Appl. No. 13/550,454, mailed on Mar. 28, 2016, Liu et al., "Reduced Sampling Low Power GPS", 20 pages.
Ramos, et al., "LEAP: A Low Energy Assisted GPS for Trajectory-Based Services", UbiComp 2011, Sep. 17-21, 2011, Beijing, China.
Translated Chinese Office Action mailed Aug. 17, 2016 for Chinese Patent Application No. 201380038013.1, a counterpart foreign application of U.S. Appl. No. 13/550,454, 11 pages.
The European Office Action mailed Sep. 23, 2016 for European Patent Application No. 13741955.2, a counterpart foreign application of U.S. Appl. No. 13/550,454, 7 pages.
Office Action for U.S. Appl. No. 14/011,140, mailed on Jul. 28, 2016, Liu et al., "Cloud-Offloaded Global Satellite Positioning", 15 pages.
Office Action for U.S. Appl. No. 13/550,454, mailed on Aug. 9, 2016, Jie Liu., "Reduced Sampling Low Power GPS", 23 pages.
The Chinese Office Action mailed Nov. 28, 2016 for Chinese Patent Application No. 201480047380.2, a counterpart foreign application of U.S. Appl. No. 14/011,140, 10 pages.
Office action for U.S. Appl. No. 13/550,454, mailed on Feb. 1, 2017, Liu et al., "Reduced Sampling Low Power GPS", 32 pages.
Office Action for U.S. Appl. No. 14/011,140, mailed on Feb. 9, 2017, Liu et al., "Cloud-Offloaded Global Satellite Positioning", 16 pages.

(56) References Cited

OTHER PUBLICATIONS

Chinese Office Action mailed Mar. 7, 2017 for Chinese Patent Application No. 201380038013.1, a counterpart foreign application of U.S. Appl. No. 13/550,454.

Chinese Office Action mailed Apr. 20, 2017 for Chinese Patent Application No. 201480060131.7, a counterpart foreign application of U.S. Appl. No. 14/067,744.

* cited by examiner

HIGH-SENSITIVITY GPS DEVICE WITH DIRECTIONAL ANTENNA

BACKGROUND

An electronic device that is equipped with a global positioning system (GPS) receiver may rely on signals transmitted by multiple GPS satellites to determine the location of the electronic device. Each of the GPS satellite signals may be transmitted with satellite-specific encoding that identifies the source satellite of the satellite signal. The GPS receiver may compute the location of the electronic device by identifying the broadcasting GPS satellites, decoding the satellite signals, and performing a series of computations on the data extracted from the decoded signals.

In some instances, a GPS receiver of an electronic device may encounter difficulty in acquiring the GPS satellite signals. For example, the GPS signals that are transmitted by the GPS satellites may be relatively weak in comparison to the background radio frequency noise that is present in an environment. Further, the GPS signals may be obstructed or reflected by terrestrial features such as buildings and natural formations. For example, building structures such as ceilings and roofs may attenuate GPS signals, leading to the loss of the GPS signals in an indoor environment. The ability of a GPS receiver to amplify weak GPS signals may be limited, as any amplification may also amplify the background radio frequency noise present in an environment. Accordingly, the electronic device may be forced to fall back to secondary geo-location techniques, such as cellular communication signal triangulation, inertial location approximation, the use of Wi-Fi signatures, or the use of frequency-modulation (FM) radio signals to determine the location of the electronic device.

SUMMARY

Described herein are techniques for using a high-gain directional antenna of an electronic device to acquire GPS signals from GPS satellites in multiple directions over numerous time intervals, and combining such GPS signals to determine a location of the electronic device. The high-gain directional antenna may include multiple antenna elements that are able to successively obtain GPS signals from multiple directions. The obtained GPS signals may be partial signals that do not include decodable positioning data, such as time stamps or ephemeris data, that are used by conventional GPS navigation units to compute locations. Instead, the techniques may use the code phases of the partial GPS signals, as acquired from a sufficient number of satellites over the multiple time intervals, to compute the location.

In at least one embodiment, the electronic device uses an antenna to perform sequential scanning in multiple directions for GPS signals. The electronic device further analyzes GPS signals obtained from the multiple directions to determine a number of acquired GPS satellites. The GPS signals provide code phases of the acquired GPS satellites. The electronic device computes a location of the electronic device based on the code phases of the acquired GPS satellites when the number of acquired GPS satellites meets a threshold.

Accordingly, the techniques enable an electronic device that is equipped with a GPS locator to use weak GPS signals that are present in indoor environments or other environments that are affected by GPS signal attenuation. The ability to use weak GPS signals may enable the electronic device to run location management applications that are otherwise unable to function effectively. For example, such applications may include navigation applications, inventory applications, personnel tracking applications, and/or so forth. The ability to pinpoint a location using attenuated GPS signals may be particularly useful in situations in which secondary sources of location information (e.g., cellular communication signals Wi-Fi signatures, FM signals, etc.) are unavailable, or be used to provide ground truths for profiling a space to enable secondary location solutions.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
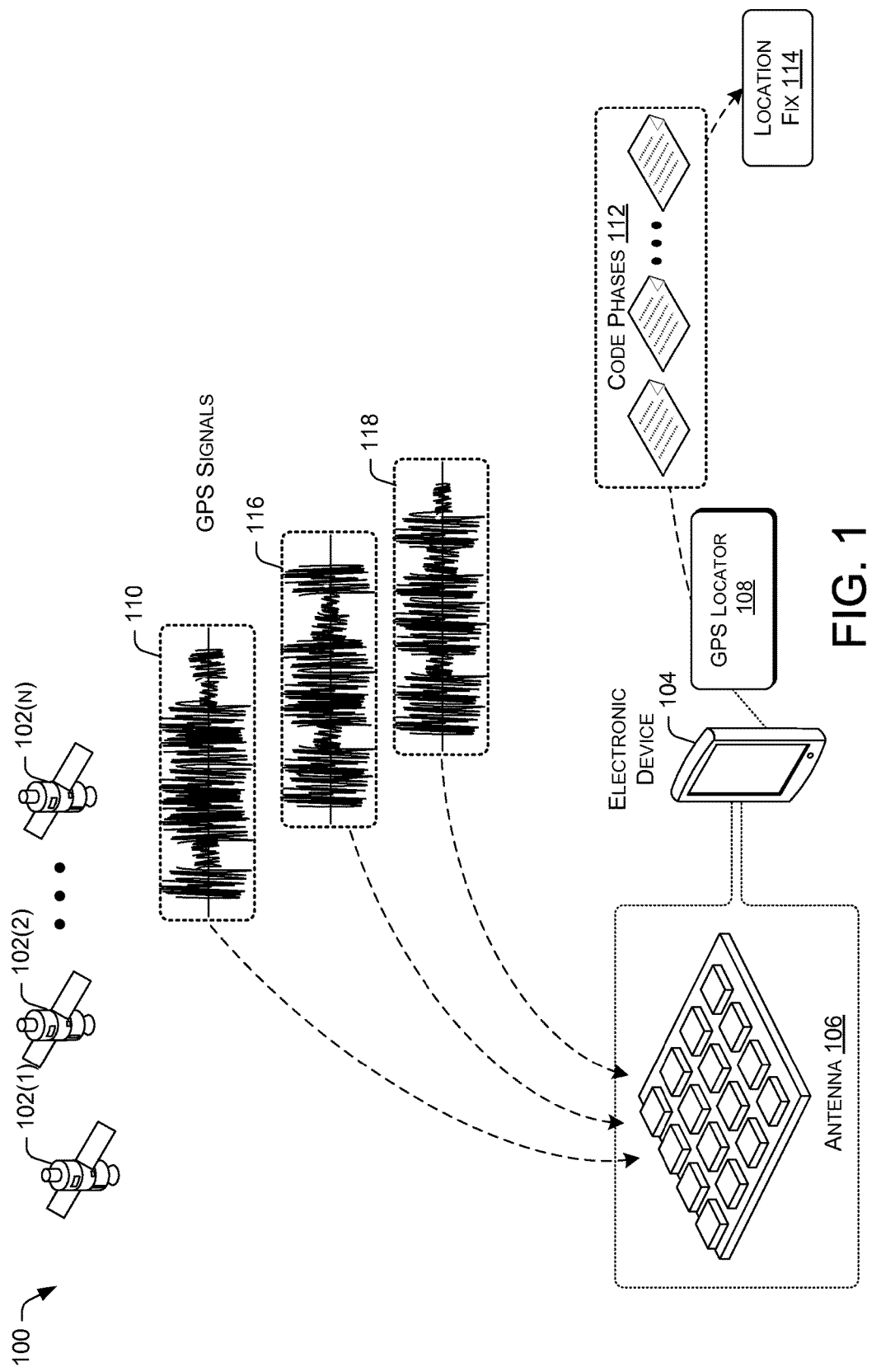
FIG. 1 is a block diagram that illustrates an example scheme for using a high-gain directional antenna to acquire GPS signals, such that the GPS signals may be used to determine a location.

Described herein are techniques for using a high-gain directional antenna of an electronic device to acquire GPS signals from GPS satellites in multiple directions over numerous time intervals, and combining such GPS signals to determine a location of the electronic device. The high-gain directional antenna may include multiple antenna elements that are able to successively obtain GPS signals from multiple directions. The obtained GPS signals may be partial signals that do not include decodable positioning data, such as time stamps or ephemeris data, that are used by conventional GPS navigation units to compute locations. Instead, the techniques rely on the code phase information indicated by the partial GPS signals, as acquired from a sufficient number of satellites over the multiple time intervals, to compute the location.

In various embodiments, the high-gain directional antenna of the electronic device may be oriented by a GPS locator of the electronic device to a particular direction. The GPS locator may scan for partial GPS signals in the particular direction for a predetermined time interval. The particular direction may be any direction that is inside a hemisphere. In at least one embodiment, the predetermined time interval may have a duration length of hundreds of milliseconds. Once the GPS locator has obtained the partial GPS signals in the particular direction, the GPS locator may determine whether the obtained partial GPS signals are from a sufficient number of GPS satellites. If the partial GPS signals are from a sufficient number of GPS satellites, the GPS locator may use the codes phases of the GPS satellites as captured in the partial GPS signals to compute a location.

However, if the GPS locator determines that the partial GPS signals are from an insufficient number of GPS satellites, the GPS locator may reorient the high-gain directional antenna to scan for GPS signals in a different direction. The GPS locator may obtain partial GPS signals in this second direction. The GPS locator may subsequently reassess whether the combination of the partial GPS signals acquired at the first and second directions are from a sufficient number of GPS satellites. If the partial GPS signals are from a sufficient number of GPS satellites, the GPS locator may use the code phases of the GPS satellites, as captured in the partial GPS signals, to compute a location for the electronic device. Otherwise, the GPS locator may once again reorient the high-gain directional antenna to scan for GPS signals in another direction. The GPS locator may repeat the reorientation of the high-gain directional antenna to scan for GPS signals until code phases from a sufficient number of GPS satellites are obtained to compute a location of the electronic device.

In some instances, because the electronic device uses a high-gain directional antenna to acquire GPS signals, the GPS locator of the electronic device may be resistant to localized GPS signal jammers. Examples of the techniques for using a high-gain directional antenna of an electronic device to acquire GPS signals from GPS satellites and determining the location of the electronic device based on the GPS signals in accordance with various embodiments are described below with reference to FIGS. 1-4.

Example Scheme

FIG. 1 is a block diagram that illustrates an example scheme 100 for using a high-gain directional antenna to acquire GPS signals, such that the GPS signals may be used to determine a location. The example scheme 100 may include GPS satellites 102(1)-102(N). The GPS satellites 102(1)-102(N) may comprise any of the satellites that are associated with a satellite navigation system. The GPS satellites 102(1)-102(N) may transmit GPS signals useful for geo-spatial positioning. For example, the GPS signals may be encoded with time stamp information, ephemeris data, almanac information, and/or so forth. Further, each of the GPS satellites 102(1)-102(N) may be uniquely identifiable by a satellite identification code, such as a Coarse/Acquisition (C/A) code pattern, that is broadcasted by the GPS satellite. In various embodiments, the satellite navigation system may be the NAVSTAR GPS operated by the United States, the Navigatsionnaya Sputnikovaya Sistema (GLONASS) operated by the Russian Federation, the Galileo Global Navigation Satellite System (GNSS) operated by the European Union, the BeiDou Navigation Satellite System (BDS) operated by China, or any other satellite navigation system.

The electronic device 104 may be equipped with an antenna 106 and a GPS locator 108. The electronic device 104 may be a desktop computer, a tablet computer, a laptop computer, a smart phone, a game console, a personal digital assistant (PDA), a portable GPS navigation unit, and so forth. The antenna 106 may be a high-gain directional antenna that is steerable by the GPS locator 108 to sequentially point to multiple directions. For example, the antenna 106 may be electrically or mechanically aimed by the GPS locator 108. In some embodiments, the antenna 106 may include an array of antenna elements. Each of the antenna elements may be a directional antenna element that is configured to receive RF signals, such as GPS signals, from a narrow sector of space. In some instances, the antenna elements may be steered mechanically to orient in different directions, so as to receive GPS signals from those directions.

For example, the antenna 106 may be a planar antenna with a dimension of 10×10 square inches, in which there are 16 antenna elements in a 4×4 grid. The planar antenna may be designed to receive RF signals at 1575.42 megahertz (MHz) with a 12.3 decibel (dBi) gain. The planar antenna may have a half power beam width of 35° with a broadside angle of 0°±0.5°. The planar antenna may be equipped with electrical servo motors that orient or reorient the planar antenna under the guidance of the GPS locator 108.

In other instances, the antenna elements of the antenna 106 may be phase shifted via an electrical signal such that GPS signal reception is reinforced in a specific direction and suppressed in other directions. In other words, the phase shifting of the antenna elements of the antenna 106 may orient or reorient the antenna 106 by changing the radiation pattern of the antenna 106 without any physical movement of the antenna 106. In additional embodiments, the antenna 106 may be of other directional designs, so long as the directional antenna may be selectively oriented to sequentially scan for GPS signals from different directions. For example, the antenna 106 may be, but is not limited to, a dish reflector antenna, a slot antenna, a Yagi antenna, a horn antenna, a waveguide antenna, a Vivaldi antenna, a planar antenna with circular antenna elements, a helix antenna, a dipole array antenna, an origami antenna, or so forth.

The high-gain directional antenna 106 may provide superior GPS signal acquisition than omni-directional antennas that are used on conventional GPS navigation unit. An omni-directional antenna of a conventional GPS navigation unit may have antenna gain that is uniform in all directions, as the omni-directional antenna is designed to simultaneously receive GPS signals from multiple GPS satellites in the sky. However, since an omni-directional antenna sacrifices signal gain for broad signal reception coverage, omni-directional antenna may be ineffective when GPS signals are attenuated. Thus, conventional GPS navigation units may be rendered useless in indoor environments.

In operation, the GPS locator 108 may orient the antenna 106 in a particular direction so that the GPS locator 108 may scan for GPS signals in the particular direction for a predetermined time interval. In at least one embodiment, the predetermined time interval may have a duration length of hundreds of milliseconds. The GPS signals 110 that are obtained by the GPS locator 108 may be a partial GPS signal that lack decodable positioning data, such as time stamps or ephemeris data, which are used by conventional GPS navigation units to compute locations. However, the partial GPS signals may include information on the code phases of the GPS satellites. Once the GPS locator 108 has obtained the partial GPS signals in the particular direction, the GPS locator 108 may determine whether the obtained partial GPS signals 110 (i.e., data chunk) are from a sufficient number of GPS satellites. If the partial GPS signals 110 are from a sufficient number of GPS satellites, the GPS locator 108 may use the code phases 112 of the GPS satellites, as captured in the partial GPS signals 110, to compute a location fix 114 of the electronic device 104.

However, if the GPS locator 108 determines that the partial GPS signals 110 are from an insufficient number of GPS satellites, the GPS locator 108 may reorient the antenna 106 to scan for GPS signals in a different direction for the predetermined time interval. Following acquisition of the GPS signals 116 from the new direction, the GPS locator 108 may subsequently reassess whether the combination of the GPS signals 110 and the GPS signals 114 acquired at the first and second directions are from a sufficient number of GPS satellites. If the partial GPS signals 110 and 116 are from a sufficient number of GPS satellites, the GPS locator 108 may use the code phases 112 of the GPS satellites as captured in the partial GPS signals 110 and 116 to compute a location. Otherwise, the GPS locator 108 may once again reorient the high-gain directional antenna to scan for GPS signals, such as the GPS signals 118, in another direction. In this way, the GPS locator may repeat the reorientation of the high-gain directional antenna until partial GPS signals from a sufficient number of GPS satellites are obtained to compute the location fix 114 of the electronic device 104.

Example Components

Figure 2:
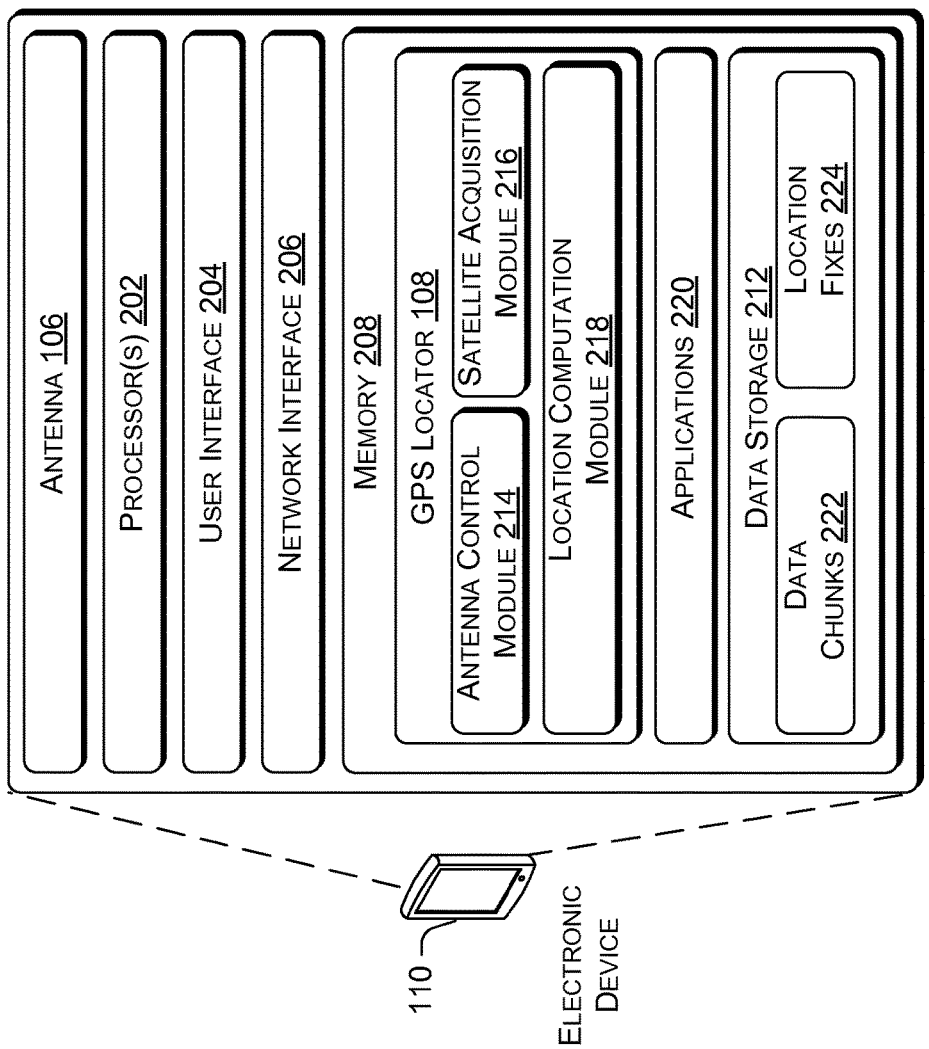
FIG. 2 is an illustrative diagram that shows example components of an electronic device that includes a high-gain directional antenna that acquires GPS signals and a GPS locator that uses the GPS signals to determine a location.

FIG. 2 is an illustrative diagram that shows example components of an electronic device 104 that includes a high-gain directional antenna that acquires GPS signals and a GPS locator that uses the GPS signals to determine a location.

The electronic device 104 may include the antenna 106, one or more processors 202, user interface 204, network interface 206, and memory 208. The one or more processors 202 may include a central processing unit (CPU), a graphics processing unit (GPU), a microprocessor, a digital signal processor, and so on. Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. The described functions may be implemented as one or more hardware logic components, such as Field-Programmable Gate Arrays (FPGAs), Application-Specific Integrated Circuits (ASICs), Program-Specific Standard Products (ASSPs), System-on-a-chip systems (SOCs), Complex Programmable Logic Devices (CPLDs), etc. Other hardware components may include an internal clock, a sound card, a video card, a camera, device interfaces, motion sensors, inertia sensors, proximity sensors, a compass, and/or so forth. The user interface 204 of the electronic device 104 may include, but are not limited to, combinations of one or more of keypads, keyboards, mouse devices, touch screens that accept gestures, microphones, voice or speech recognition devices, and any other suitable devices or other electronics/software. The network interface 206 may include a network interface card (NIC) and/or other network component that provide wired and/or wireless communication.

The memory 208 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 208 may store software components that include the GPS locator 108 and applications 210. Data storage 212 may also be implemented using the memory 208. The GPS locator 108 may include an antenna control module 214, a satellite acquisition module 216, and a location computation module 218.

The antenna control module 214 may send electrical signals that direct the antenna 106 to point to different directions. The directions may be randomly selected or based on a predetermined pattern. In some embodiments, the electrical signals provided by the antenna control module 214 may control one or more servo motors that aim the antenna 106. In other embodiments, the electrical signals provided by the antenna control module 214 may phase shift an array of antenna elements in the antenna 106, such that GPS signal reception is reinforced in a specific direction and suppressed in other directions.

The satellite acquisition module 216 may obtain GPS signals from various directions using the antenna 106. Further, the satellite acquisition module 216 may analyze the GPS signals to determine whether the GPS signals are received from a sufficient number of GPS satellites in order for the location computation module 218 to compute the location of the electronic device 104. At a minimum, the calculation of a location by the location computation module 218 may be dependent on the acquisition of GPS signals from at least five GPS satellites. The use of the GPS signals from the five GPS satellites is dictated by the five unknowns that are used by the location computation module 218 to determine the location. The first three unknowns (x, y, and z) are the three-dimensional location of the electronic device 104 in Cartesian coordinates. The fourth unknown is the common bias for the internal clock of the electronic device 104 with respect to the GPS signals that are received at a particular direction. The fifth unknown is the coarse time error for the internal clock of the electronic device 104 with respect to a moment that the GPS signals are received at the particular direction. In at least one embodiment, if a GPS signal is strong enough for the satellite acquisition module 216 to decode time stamps sent from a GPS satellite, the coarse time error may be omitted in the location calculation.

In instances in which the satellite acquisition module 216 is unable to locate GPS signals from five GPS satellites in a particular direction, the satellite acquisition module 216 may scan for GPS signals from additional GPS satellites in a different direction, and so on and so forth. The satellite acquisition module 216 may perform such scans until the GPS signals from a sufficient number of GPS satellites are acquired. However, each scan in a new direction by the satellite acquisition module 216 introduces two new unknowns that the location computation module 218 has to solve to determine the location fix 114. The first new unknown that is introduced at each scan is the common bias for the internal clock of the electronic device 104 with respect to the GPS signals that are received at a new direction. The second new unknown is the coarse time error for the internal clock of the electronic device 104 with respect to a moment that the GPS signals are received at the new direction.

Accordingly, the relationship between the number of GPS satellites that is considered sufficient and the number of scans for GPS signals at different directions may be generalized by the equation 2n+3, in which n is the number of independent scans. This equation yields the following table that illustrates the relationship between the number of independent scans and the number of GPS satellites considered sufficient per each scan:

TABLE 1

Number of GPS Satellites Sufficient for Independent Scans

| Number of Independent Scans (n) | Number of GPS Satellites (2n + 3) |
|---|---|
| 1 | 5 |
| 2 | 7 |
| 3 | 9 |
| 4 | 11 |

However, the satellite acquisition module 216 may consider the same GPS satellite that is acquired in different scans as different acquired satellites. For example, a GPS satellite "A" may be acquired during both a first scan and a second scan. In such an example, the GPS satellite "A" may be counted as two of the seven satellites that are deemed as sufficient according to the table above for two scans. The satellite acquisition module 216 may count the GPS satellite "A" in the above example twice because the GPS satellite "A" has moved its location in the sky between the two independent scans. As a result, the GPS satellite "A" can be treated as two separate satellites for the location fix 114 calculation performed by the location computation module 218.

The calculation of the location fix 114 by the location computation module 218 is also dependent on obtaining GPS signals that provide the code phases of the GPS satellites. In various embodiments, a code phase is a time duration between a start time that the satellite acquisition module 216 starts to sample a GPS signal from a GPS satellite to a time at which a beginning of an acquisition code pattern, e.g., C/A code pattern, that is being transmitted by the GPS signal is received. The acquisition code pattern may be repeated continuously by a GPS satellite. Once activated, the satellite acquisition module 216 may start sampling from an arbitrary time in the middle of an acquisition code pattern. Thus, when the satellite acquisition module 216 acquires the beginning of a subsequent acquisition code pattern repetition, the satellite acquisition module 216 may determine the code phase.

The signal acquisition time interval of a conventional GPS navigation unit is generally on the order of one millisecond. Such a signal acquisition time interval may be insufficient time to capture a repeating GPS signal spike (i.e., correlation spike) that signals a start of the acquisition code pattern. In contrast, the satellite acquisition module 216 may use a signal acquisition time interval that lasts hundreds of milliseconds. The longer signal acquisition time interval may enable the satellite acquisition module 216 to detect the correlation spike rather than other noise spikes in the RF background noise. This is because the signal strength of the GPS signal spike is generally a number of orders of magnitude greater than the signal strength of the noise spikes, such that satellite acquisition module 216 is not confused by the noise spikes. The raw data in the GPS signals that is captured by the satellite acquisition module 216 in each direction may be referred to as a data chunk. Accordingly, the set of GPS signals that the electronic device 104 receives while stationary at a location may contain multiple data chunks. The satellite acquisition module 216 may analyze each data chunk to determine the number and identities of GPS satellites the provided the GPS signals.

In various embodiments, satellite acquisition module 216 may use a cross correlation matrix for each time subinterval (e.g., every millisecond) of the GPS signals in each data chunk. The rows of the cross correlation matrix may include different Doppler frequencies, and columns may include different code phases. Accordingly, assuming C(k) represents such a matrix using the k-th ms signal, then $C(k)=[c_{i,j}(k)]$, in which $c_{i,j}$ is the (i,j)-th element of the matrix.

In order to detect the correlation spikes, the satellite acquisition module 216 may take the sum of the element-wise absolute value of multiple correlation matrices, C(1), C(2), ... C(n) and identify the highest spike (i.e., a peak spike) in the summation. Accordingly, given $|C(k)|=|c_{i,j}(k)|$, the satellite acquisition module 216 may compute:

$$C=\Sigma_{k=1}^{n}|C(k)| \quad (1)$$

Subsequently, the satellite acquisition module 216 may compare the highest value of C, e.g., $M_1$ with the second highest value $M_2$. If $M_1>\alpha M_2$ with a predetermined $\alpha$ (i.e., a threshold difference), then the satellite acquisition module 216 may determine that a corresponding satellite is acquired, and the column index of $M_1$ may represent the code phase.

The location computation module 218 may compute the location fix 114 of the electronic device 104 when data chunks are acquired from a sufficient number of GPS satellites. The location computation module 218 may compute the location fix 114 even when the received GPS signals are weak or intermittent. The weak or intermittent GPS signals may lack decodable positioning data, such as time stamps or ephemeris data. Instead, the location computation module 218 may use a coarse time navigation technique to compute the location fix 114. Generally speaking, coarse time navigation may be expressed as the following equation:

$$P_i = \sqrt{(x_i + v_{xi}\Delta T - x)^2 + (y_i + v_{yi}\Delta T - y)^2 + (z_i + v_{zi}\Delta T - z)^2} + c \cdot \tau \quad (2)$$

in which $P_i$ represents the distance measurement from time of flight (using code phase and a reference location), $(x_i, y_i, z_i)$ represents a location of the satellite i at the time the signal left the satellite i, $(v_{xi}, v_{yi}, v_{zi})$ represents the location of the electronic device to be computed. Further, $\Delta T$ represents the coarse time error, i.e., the difference between a time stamp of the electronic device and a time stamp of a satellite when the signal left the satellite, and $\tau$ represents the common bias, which is the discrepancy between the internal clock of the electronic device that is used to measure the time of flight for a satellite and a standardized clock.

Accordingly, the location computation module 218 may use the following unknowns in a location fix calculation: (1) (x, y, z), which are the three-dimensional location of the electronic device 104 in Cartesian coordinates; (2) $b_k$, the internal clock common bias for chunk k; (3) $c_k$, a set of variables for the coarse time error for the entire set of chunks being analyzed. In some instances, $c_k$ may be replaced with a variable that represents the coarse time error associated with the entire set of chunks, e.g., a variable that is set at the beginning of the entire set of chunks.

The location computation module 218 may use a pseudorange navigation equation for each acquired satellite to compute the location fix 114. In other words, if satellite s is acquired in chunk k, then location computation module 218 may apply the navigation equation $D_s(x, y, z, b_k, c_k)=d_s \cdot c$, in which $D_s$ is the distance between satellite s and the electronic device 104, $d_s$ is the signal propagation time from the satellite s to the electronic device 104 as estimated from a corresponding code phase, and c is the speed of light. Thus, as long as the total number of navigation equations is greater than the total number of unknowns, the location computation module 218 may compute the location (x, y, z) for the electronic device 104.

In alternative embodiments, the functions that are performed by one or more modules of the GPS locator 108 may be implemented in hardware rather than as software instructions. For example, one or more fixed hardware logic circuits may implement the functions performed by the one or more modules.

The applications 220 may enable the electronic device 106 to perform various functions. The applications 220 may include an operating system. The operating system may include components that enable the electronic device 104 to receive data via various inputs (e.g., user controls, network interfaces, and/or memory devices), and process the data using the processors 202 to generate output. The operating system may further include one or more components that present the output (e.g., display an image on an electronic display, store data in memory, transmit data to another electronic device, etc.). The operating system may enable a user to interact with the applications 220 using the user interface, as well perform tasks for the applications 220. Additionally, the operating system may include other components that perform various other functions generally associated with an operating system, such as supporting the execution of the various modules stored in the memory 208.

In various embodiments, the applications 220 may include application that use the location fix 114 obtained by the GPS locator 108 to perform functions. For example, the applications 220 may include a location management application that reports the location fixes obtained by the GPS locator 108 to a remote application or service. The remote application or service may correlate the location fixes with other data, such as map data, purchases or browsing habits of the user of the electronic device 104, business location data, and/or so forth. In some instances, the remote application or service may provide content that are relevant to the location fixes back to the electronic device 104. The content may be displayed by the location management application on the electronic device 104.

In other embodiments, the applications 220 may include an application that enable the GPS locator 108 to offload the data processing performed by one or more modules of the GPS locator 108 to a remote computing device. For example, the application may enable a remote server to perform the calculations that are carried out by the location computation module 218. Such offloading of the computation may lighten the computation demand and energy consumption by the electronic device 104. In such an example, the application may include an application program interface (API) that interfaces with a computation application on the remote computing device.

In additional embodiments, the applications 220 may also include a location approximation application that is able to calculate an intermediate location for the electronic device 104 based on the multiple location fixes produced by the GPS locator 108. For example, the location approximation application may use measured values such as inertia, velocity, speed, and/or so forth of the electronic device 104 in combination with one or more location fixes to approximate the location of the electronic device 104 between location fixes.

The data storage 212 may store data that are used by the various modules of the GPS locator 108 and the applications 210. For example, the data storage 212 may store the data chunks 222 that are obtained by the GPS locator 108, the location fixes 224 that are generated by the GPS locator 108, and so forth. In other examples, the data storage 212 may store the content that is relevant to the location fixes, the locations that are approximated by the location approximation application, and/or so forth.

In various embodiments, the GPS locator 108 and/or various other application that are on the electronic device 104 are configured to perform location acquisition and/or located-based content provision functions after obtaining permission from the user of the electronic device 104. For example, prior to starting a location acquisition or a series of location acquisitions, the GPS locator 108 may cause the user interface 204 to display a dialogue box. The dialogue box may ask to the user of the electronic device 104 for permission to obtain the location of the electronic device 104. In turn, the user may provide permission by selecting a confirmation option or decline permission by selecting a dismiss option of the dialogue box. In this way, the user 128 may be given an opportunity to opt out of the location acquisition. In another example, prior to providing content based on a location of the electronic device 104, an application may cause the user interface 204 to display a dialogue box that asks the user of the electronic device 104 for permission. In turn, the user may provide permission by selecting a confirmation option or decline permission by selecting a dismiss option of the dialogue box. With the use of such dialogue boxes, the user of the electronic device 104 may safeguard his or her privacy.

While the GPS locator 108 is described above as computing location fixes using GPS signals from a high-gain directional antenna, the GPS locator 108 may also use GPS signals acquired from omni-directional antennas. The GPS locator 108 may perform such computation provided that the GPS signals acquired using an omni-directional antenna has the same properties as the GPS signals provided by a high-gain directional antenna. Further, because the GPS locator 108 uses a high-gain directional antenna to acquire GPS signals, the GPS locator 108 may be resistant to localized GPS signal jammers.

Example Processes

Figure 3:
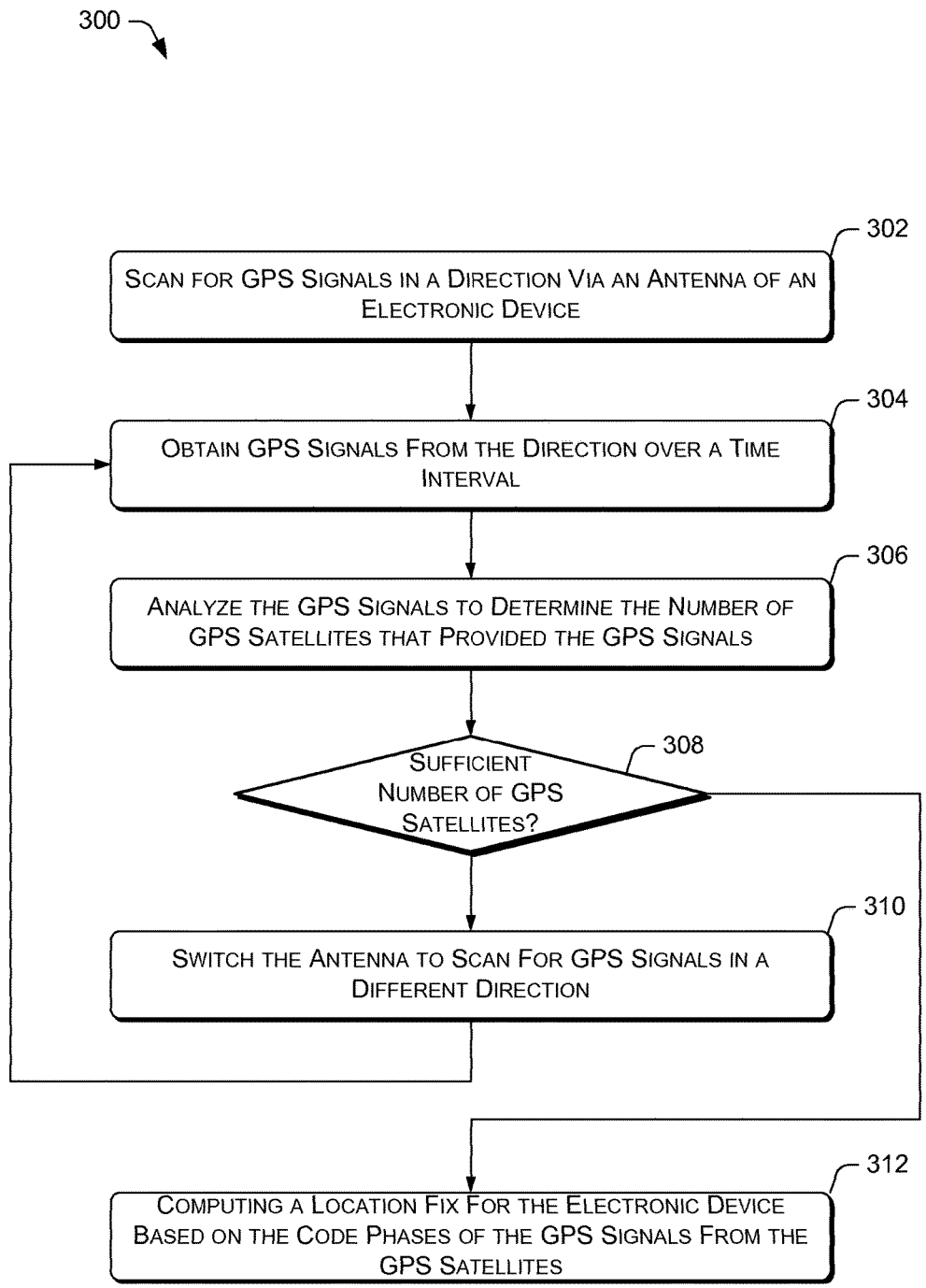
FIG. 3 is a flow diagram that illustrates an example process for using multiple GPS signals that are acquired by a high-gain directional antenna to determine a location.
Figure 4:
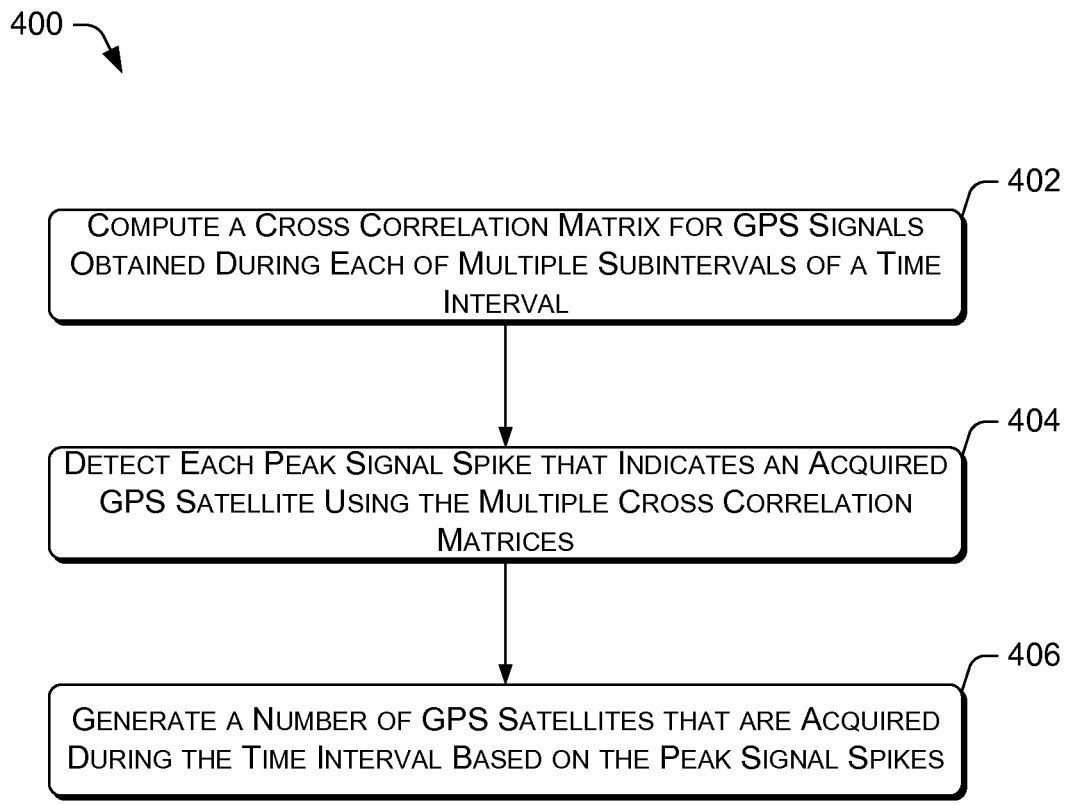
FIG. 4 is a flow diagram that illustrates an example process for determining a number of satellites that are acquired during a time interval in which a high-gain directional antenna is oriented at a particular direction.

FIGS. 3 and 4 describe various example processes for using a high-gain directional antenna of an electronic device to acquire GPS signals from GPS satellites in multiple directions over numerous time intervals, and combining such GPS signals to determine a location of the electronic device. The order in which the operations are described in each example process is not intended to be construed as a limitation, and any number of the described operations may be combined in any order and/or in parallel to implement each process. Moreover, the operations in each of the FIGS. 3 and 4 may be implemented in hardware, software, and/or a combination thereof. In the context of software, the operations may represent computer-executable instructions that, when executed by one or more processors, cause one or more processors to perform the recited operations. The one or more processors may be included in individual computing devices or included in multiple computing devices that are, for example, part of a cloud. Generally, computer-executable instructions include routines, programs, objects, components, data structures, and so forth that cause the particular functions to be performed or particular abstract data types to be implemented. In other embodiments, the operations of each example process may be executed by a hardware logic circuit, such as a dedicated integrated circuit.

FIG. 3 is a flow diagram that illustrates an example process 300 for using multiple GPS signals that are acquired by a high-gain directional antenna to determine a location. At block 302, the GPS locator 108 may scan for GPS signals in a particular direction via an antenna 106 of the electronic device 104. The antenna 106 may be a high-gain directional antenna that is steerable by the GPS locator 108 to point to multiple directions. For example, the antenna 106 may be electrically or mechanically aimed by the GPS locator 108.

At block 304, the GPS locator 108 may obtain GPS signals from the particular direction over a time interval. In at least one embodiment, the time interval may have a duration length of hundreds of milliseconds. The GPS signals that are obtained by the GPS locator 108 may be partial GPS signals that lack decodable positioning data, such as time stamps or ephemeris data. However, such GPS signals may provide one or more code phases of corresponding GPS satellites, such as the GPS satellites 102(1)-102(N).

At block 306, the GPS locator 108 may analyze the GPS signals to determine the number of GPS satellites that provide the GPS signals. In other words, the GPS locator 108 may determine the number of GPS satellites that are acquired by the GPS locator 108 during the time interval. In various embodiments, the identification of each GPS satellite may involve the detection of peak signal spikes in the GPS signals over the time interval, in which the timing of each peak signal spike may be used to calculate a code phase of a GPS satellite.

At decision block 308, the GPS locator 108 may determine whether a sufficient number of GPS satellites are acquired. The number of GPS satellites that are deemed as sufficient is related to a number of independent scans for GPS signals that are performed by the GPS locator. In various embodiments, the relationship between the number of GPS satellites that is considered sufficient and the number of scans for GPS signals at different directions may be generalized by the equation 2n+3, in which n is the number of independent scans. Thus, if the GPS locator 108 determines that an insufficient numbers of GPS satellites are acquired ("no" at decision block 308), the process 300 may proceed to block 310.

At block 310, the GPS locator 108 may switch the antenna 106 to scan for GPS signals in a different direction. In some embodiments, the GPS locator 108 may reorient the antenna 106 by sending electrical signals that cause servo motors to mechanically steer the antenna 106. In other embodiments, the GPS locator 108 may reorient the antenna 106 by sending electrical signals that cause antenna elements of the antenna 106 to phase shift such that GPS signal reception is reinforced in a new direction. Subsequently, the process 300 may loop back to block 304 at which point the GPS locator 108 may obtain GPS signals from the new direction. However, if the GPS locator 108 determines that a sufficient number of GPS satellites are acquired ("yes" at decision block 308), the process 300 may proceed to block 312.

At block 312, the GPS locator 108 may compute a location fix, such as the location fix 114, for the electronic device 104 based on the code phases of the GPS signals from the acquired satellites. In various embodiments, the GPS locator 108 may use a coarse time navigation technique to compute the location fix 114.

FIG. 4 is a flow diagram that illustrates an example process 400 for determining a number of satellites that are acquired during a time interval in which a high-gain directional antenna is oriented at a particular direction. The process 400 further illustrates block 306 of the process 300.

At block 402, the GPS locator 108 may compute a cross correlation matrix for GPS signals obtained during each of multiple subintervals of a time interval. In one instance, the time interval may have a duration length of 100 milliseconds, and each of the subintervals may have a duration length of one millisecond. The rows of each cross correlation matrix may include different Doppler frequencies, and columns may include different code phases.

At block 404, the GPS locator 108 may detect each signal spike that indicates an acquired satellite using the multiple cross correlation matrices. In various embodiments, the GPS locator 108 may detect each peak signal spike by taking the sum of the element-wise absolute value of multiple correlation matrices and identify a peak signal spike from multiple signal spikes in the summation. The multiple cross correlation matrices may also provide the code phases of the acquired satellites.

At block 406, the GPS locator 108 may generate a number of satellites that are acquired during the time interval based on the peak signal spikes. The GPS locator 108 may count the number of peak signal spikes to compute the number of satellites that are acquired.

In summary, the techniques may enable an electronic device that is equipped with the GPS locator to use weak GPS signals that are present in indoor environments or other environments that are affected by GPS signal attenuation. The ability to use weak GPS signals may enable the electronic device to run location management applications that are otherwise unable to function effectively.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. A computer-implemented method, comprising:
   performing sequential scanning in multiple directions for global positioning system (GPS) signals via an antenna of an electronic device, the scanning in each of the multiple directions being performed for a time interval;
   analyzing the GPS signals obtained from scans in the multiple directions to determine a number of acquired GPS satellites that provided the GPS signals, the GPS signals indicating code phases of the acquired GPS satellites;
   computing a location of the electronic device based on the code phases of the acquired GPS satellites in response to determining that the number of acquired GPS satellites meets a threshold number; and
   increasing the threshold number in response to a number of directions scanned increasing.

2. The computer-implemented method of claim 1, wherein the antenna is a high-gain directional antenna that is at least one of electrically adjusted or mechanically oriented in the multiple directions.

3. The computer-implemented method of claim 2, wherein the antenna includes an array of antenna elements that are phase shifted to reinforce signal reception in a specific direction and suppress signal reception in one or more other directions.

4. The computer-implemented method of claim 1, wherein the GPS signals lack decodable positioning data, the decodable positioning data including time stamp and ephemeris information for calculating the location.

5. The computer-implemented method of claim 1, wherein the analyzing includes:
   computing a cross correlation matrix for corresponding GPS signals obtained during each of multiple subintervals of the time interval to generate a plurality of cross correlation matrices;
   detecting one or more peak signal spikes from multiple signal spikes using the plurality of cross correlation matrices, each peak signal spike indicating an acquired GPS satellite; and
   generating the number of acquired GPS satellites based on a number of the peak signal spikes.

6. The computer-implemented method of claim 1, wherein the analyzing includes considering a GPS satellite that is acquired during different scans as different acquired GPS satellites.

7. The computer-implemented method of claim 1, wherein the computing includes computing the location using a coarse time navigation technique based on the code phases of the acquired GPS satellites.

8. The computer-implemented method of claim 1, wherein the threshold number is defined as 2n+3, in which n is the number of directions scanned.

9. One or more non-transitory computer-readable media storing computer-executable instructions that upon execution cause one or more processors controlling one or more hardware to perform acts comprising:
   scanning for global positioning system (GPS) signals in a first direction via a directional antenna of an electronic device;
   obtaining, via the one or more hardware, GPS signals from the first direction over a time interval that includes multiple milliseconds;
   analyzing, via the one or more hardware, the GPS signals obtained from the first direction to determine a number of acquired GPS satellites that provided the GPS signals at the first direction;
   switching, via the one or more hardware, the directional antenna to scan for GPS signals in a second direction that is different from the first direction in response to determining that the GPS signals obtained at the first direction are from a first insufficient number of GPS satellites to compute a location; and
   computing, via the one or more hardware, a location fix for the electronic device based at least on code phases of the GPS signals from the GPS satellites in the first direction in response to determining that the GPS signals obtained at the first direction are from a first sufficient number of GPS satellites to compute the location.

10. The one or more computer-readable media of claim 9, wherein the acts further comprises:
   analyzing the GPS signals obtained from the second direction to determine a number of GPS satellites that provided the GPS signals at the second direction over the time interval;
   determining whether the GPS signals obtained from the first direction and the second direction are from a second sufficient number of acquired GPS satellites to compute the location, wherein the determining includes considering a GPS satellite that is acquired during different scans as different acquired GPS satellites;
   switching the directional antenna to scan for GPS signals in a third direction that is different from the first and second directions in response to determining that the GPS signals obtained at the first and second directions are from a third insufficient number of acquired GPS satellites to compute the location; and
   computing a location fix for the electronic device based on code phases of the GPS signals from the acquired GPS satellites in the first and second directions in response to determining that the GPS signals obtained at the first and second directions are from the second sufficient number of GPS satellites to compute the location.

11. The one or more computer-readable media of claim 9, wherein the sufficient number of GPS satellites is defined as 2n+3, in which n is the number of directions scanned.

12. The one or more computer-readable media of claim 9, wherein the directional antenna is at least one of electrically adjustable or mechanically steerable for GPS signal scanning in multiple directions.

13. The one or more computer-readable media of claim 9, wherein the directional antenna includes an array of antenna elements that are phase shifted to reinforce signal reception in a specific direction and suppress signal reception in one or more other directions.

14. The one or more computer-readable media of claim 9, wherein the GPS signals lack decodable positioning data that includes time stamp and ephemeris information.

15. The one or more computer-readable media of claim 9, wherein the analyzing includes:
   computing a cross correlation matrix for corresponding GPS signals obtained during each of multiple subintervals of the time interval to generate a plurality of cross correlation matrices;
   detecting one or more peak signal spikes from multiple signal spikes using the plurality of cross correlation matrices, each peak signal spike indicating an acquired GPS satellite; and
   generating the number of acquired GPS satellites based on a number of the peak signal spikes.

16. The one or more computer-readable media of claim 9, wherein the computing includes computing the location using a coarse time navigation technique based on the code phases of the acquired GPS satellites.

17. An electronic device, comprising:
   a directional antenna;
   one or more processors;
   one or more motors;
   a memory that includes a plurality of computer-executable modules that are executable by the one or more processors, the modules comprising:
      an antenna control module that controls the one or more motors to sequentially aim the directional antenna in multiple directions to scan for GPS signals;
      a satellite acquisition module that analyzes the GPS signals obtained from scans in the multiple directions to determine a number of acquired GPS satellites that provided the GPS signals, the GPS signals indicating code phases of the acquired GPS satellites;
      a location computation module that computes a location of the electronic device based on the code phases of the acquired GPS satellites in response to determining that the number of acquired GPS satellites meets a threshold number; and increasing the threshold number in response to a number of directions scanned increasing.

18. The electronic device of claim 17, further comprising one or more of:

a location approximation module that derives an approximated location based on multiple locations computed by the location computation module; or a location management module that at least one of reports the location of the electronic device as obtained by the location computation module to a remote server or causes display of content that is relevant to the location of the electronic device on the electronic device.

19. The device of claim 17, wherein the satellite acquisition module considers a GPS satellite that is acquired during different scans as different acquired GPS satellites.

20. The electronic device of claim 17, wherein the GPS signals lack decodable positioning data that includes time stamp and ephemeris information, and wherein the location computation module uses a coarse time navigation technique to compute the location based on the code phases of the acquired GPS satellites.

* * * * *